US007725938B2

(12) United States Patent
Cothrell et al.

(10) Patent No.: US 7,725,938 B2
(45) Date of Patent: May 25, 2010

(54) INLINE INTRUSION DETECTION

(75) Inventors: Scott A. Cothrell, Cedar Park, TX (US);
Aaron S. Richardson, Cedar Park, TX (US)

(73) Assignee: Cisco Technology, Inc., San Jose, CA (US)

( * ) Notice: Subject to any disclaimer, the term of this patent is extended or adjusted under 35 U.S.C. 154(b) by 1426 days.

(21) Appl. No.: 11/039,219

(22) Filed: Jan. 20, 2005

(65) Prior Publication Data
US 2006/0161983 A1    Jul. 20, 2006

(51) Int. Cl.
G06F 11/00    (2006.01)
G06F 12/14    (2006.01)
G06F 12/16    (2006.01)
G08B 23/00    (2006.01)

(52) U.S. Cl. .............................. 726/23; 726/13; 726/25
(58) Field of Classification Search .................. 726/13, 726/23, 22, 24, 25
See application file for complete search history.

(56) References Cited

U.S. PATENT DOCUMENTS

| | | | | |
|---|---|---|---|---|
| 3,974,328 | A | 8/1976 | Thomas et al. ............... 178/6.8 |
| 4,103,847 | A | 8/1978 | Thomas et al. ............. 244/3.18 |
| 4,286,261 | A | 8/1981 | Wagner et al. .............. 340/565 |
| 4,931,740 | A | 6/1990 | Hassanzadeh et al. ....... 324/457 |
| 4,991,146 | A | 2/1991 | Ransdell et al. ............... 367/98 |
| 5,311,510 | A | * 5/1994 | Moriue et al. ............... 370/428 |
| 5,557,742 | A | 9/1996 | Smaha et al. ............... 395/186 |
| 5,963,556 | A | 10/1999 | Varghese et al. ............ 370/250 |
| 6,035,405 | A | 3/2000 | Gage et al. .................. 713/201 |
| 6,279,113 | B1 | 8/2001 | Vaidya ....................... 713/201 |
| 6,477,651 | B1 | 11/2002 | Teal ........................... 713/200 |
| 6,487,666 | B1 | 11/2002 | Shanklin et al. ............. 713/201 |
| 6,560,236 | B1 | 5/2003 | Varghese et al. ............. 370/401 |
| 6,584,565 | B1 | 6/2003 | Zamek ....................... 713/156 |
| 6,647,400 | B1 | 11/2003 | Moran ........................ 707/205 |
| 6,715,084 | B2 | 3/2004 | Aaron et al. ................. 713/201 |
| 6,785,821 | B1 | 8/2004 | Teal ........................... 713/200 |
| 6,792,546 | B1 | 9/2004 | Shanklin et al. ............. 713/201 |
| 6,826,697 | B1 | 11/2004 | Moran ........................ 713/201 |
| 6,898,632 | B2 | * 5/2005 | Gordy et al. ................. 709/224 |
| 6,928,549 | B2 | 8/2005 | Brock et al. ................. 713/194 |
| 6,950,628 | B1 | 9/2005 | Meier et al. ................. 455/41.2 |

(Continued)

OTHER PUBLICATIONS

PCT, Notification of Transmittal of the International Search Report and the Written Opinion of the International Searching Authority, or the Declaration, PCT/US05/24592, 7 pages, Mailed Jul. 20, 2006.

(Continued)

*Primary Examiner*—David García Cervetti
(74) *Attorney, Agent, or Firm*—Baker Botts L.L.P.

(57) ABSTRACT

A method for inline intrusion detection includes receiving a packet at a network gateway, storing the packet, and assigning an identifier to the packet. The method also includes transmitting a copy of the packet and the identifier from the network gateway to an intrusion detection system and analyzing the copy of the packet by the intrusion detection system to determine whether the packet includes an attack signature and communicating a reply message from the intrusion detection system to the network gateway. The reply message includes the identifier and is indicative of the results of the analysis. The size of the reply message is less than the size of the packet.

34 Claims, 1 Drawing Sheet

U.S. PATENT DOCUMENTS

| | | | |
|---|---|---|---|
| 6,996,843 B1 | 2/2006 | Moran | 726/23 |
| 7,032,114 B1 | 4/2006 | Moran | 713/187 |
| 7,051,365 B1 | 5/2006 | Bellovin | 726/11 |
| 7,076,803 B2* | 7/2006 | Bruton et al. | 726/23 |
| 7,107,612 B1* | 9/2006 | Xie et al. | 726/13 |
| 7,150,043 B2* | 12/2006 | Brock et al. | 726/23 |
| 7,177,295 B1 | 2/2007 | Sholander et al. | 370/338 |
| 7,222,366 B2* | 5/2007 | Bruton et al. | 726/23 |
| 7,281,269 B1* | 10/2007 | Sievers et al. | 726/24 |
| 7,310,815 B2* | 12/2007 | Yanovsky | 726/13 |
| 7,331,061 B1* | 2/2008 | Ramsey et al. | 726/23 |
| 7,451,489 B2* | 11/2008 | Cantrell et al. | 726/25 |
| 7,454,499 B2* | 11/2008 | Cantrell et al. | 709/225 |
| 7,454,792 B2* | 11/2008 | Cantrell et al. | 726/25 |
| 2002/0009078 A1 | 1/2002 | Wilson et al. | 370/389 |
| 2002/0069356 A1* | 6/2002 | Kim | 713/160 |
| 2002/0073337 A1 | 6/2002 | Ioele et al. | 713/201 |
| 2002/0101870 A1 | 8/2002 | Chase et al. | 370/389 |
| 2002/0107961 A1 | 8/2002 | Kinoshita | 709/225 |
| 2002/0143948 A1 | 10/2002 | Maher, III et al. | 709/226 |
| 2003/0009693 A1 | 1/2003 | Brock et al. | 713/201 |
| 2003/0014662 A1 | 1/2003 | Gupta et al. | 713/200 |
| 2003/0061514 A1 | 3/2003 | Bardsley et al. | 713/201 |
| 2003/0069972 A1 | 4/2003 | Yoshimura et al. | 709/226 |
| 2003/0084318 A1* | 5/2003 | Schertz | 713/200 |
| 2003/0084321 A1* | 5/2003 | Tarquini et al. | 713/200 |
| 2003/0084328 A1* | 5/2003 | Tarquini et al. | 713/200 |
| 2003/0084329 A1* | 5/2003 | Tarquini | 713/200 |
| 2003/0084344 A1* | 5/2003 | Tarquini et al. | 713/201 |
| 2003/0110393 A1* | 6/2003 | Brock et al. | 713/200 |
| 2003/0145225 A1* | 7/2003 | Bruton et al. | 713/201 |
| 2003/0145226 A1* | 7/2003 | Bruton et al. | 713/201 |
| 2003/0149887 A1 | 8/2003 | Yadav | 713/200 |
| 2003/0154399 A1* | 8/2003 | Zuk et al. | 713/201 |
| 2003/0188190 A1 | 10/2003 | Aaron et al. | 713/201 |
| 2003/0188191 A1 | 10/2003 | Aaron et al. | 713/201 |
| 2003/0236992 A1 | 12/2003 | Yami | 713/200 |
| 2004/0030927 A1* | 2/2004 | Zuk | 713/201 |
| 2004/0049693 A1 | 3/2004 | Douglas | 713/200 |
| 2004/0059942 A1* | 3/2004 | Xie | 713/201 |
| 2004/0083295 A1 | 4/2004 | Amara et al. | 709/229 |
| 2004/0093513 A1* | 5/2004 | Cantrell et al. | 713/201 |
| 2004/0117478 A1* | 6/2004 | Triulzi et al. | 709/224 |
| 2004/0202157 A1 | 10/2004 | Chase et al. | 370/389 |
| 2004/0221171 A1 | 11/2004 | Ahmed et al. | 713/200 |
| 2004/0221178 A1 | 11/2004 | Aaron et al. | 713/201 |
| 2004/0255154 A1 | 12/2004 | Kwan et al. | 713/201 |
| 2004/0260945 A1 | 12/2004 | Raikar et al. | 713/201 |
| 2005/0005031 A1* | 1/2005 | Gordy et al. | 709/250 |
| 2005/0018618 A1* | 1/2005 | Mualem et al. | 370/252 |
| 2005/0022018 A1 | 1/2005 | Szor | 713/201 |
| 2005/0028013 A1* | 2/2005 | Cantrell et al. | 713/201 |
| 2005/0044199 A1 | 2/2005 | Shiga et al. | 709/223 |
| 2005/0050353 A1* | 3/2005 | Thiele et al. | 713/201 |
| 2005/0058132 A1 | 3/2005 | Okano et al. | 370/389 |
| 2005/0071642 A1 | 3/2005 | Moghe et al. | 713/182 |
| 2005/0071643 A1 | 3/2005 | Moghe | 713/182 |
| 2005/0071644 A1 | 3/2005 | Moghe et al. | 713/182 |
| 2005/0076245 A1 | 4/2005 | Graham et al. | 713/201 |
| 2005/0081058 A1 | 4/2005 | Chang et al. | 713/201 |
| 2005/0097358 A1* | 5/2005 | Yanovsky | 713/201 |
| 2005/0132230 A1 | 6/2005 | Miclea et al. | 713/201 |
| 2005/0157653 A1 | 7/2005 | Zeitak et al. | 370/241 |
| 2005/0185626 A1 | 8/2005 | Meier et al. | 370/338 |
| 2005/0193429 A1 | 9/2005 | Demopoulos et al. | 726/23 |
| 2005/0216770 A1 | 9/2005 | Rowett et al. | 713/201 |
| 2005/0226257 A1 | 10/2005 | Mirzabegian et al. | 370/401 |
| 2005/0229246 A1* | 10/2005 | Rajagopal et al. | 726/14 |
| 2005/0259646 A1* | 11/2005 | Smith et al. | 370/389 |
| 2005/0278178 A1 | 12/2005 | Girouard et al. | 704/270 |
| 2005/0283831 A1* | 12/2005 | Ryu et al. | 726/11 |
| 2006/0007903 A1 | 1/2006 | Hammell | 370/342 |
| 2006/0023709 A1* | 2/2006 | Hall et al. | 370/389 |
| 2006/0085855 A1 | 4/2006 | Shin et al. | 726/23 |
| 2007/0058551 A1* | 3/2007 | Brusotti et al. | 370/241 |

OTHER PUBLICATIONS

U.S. Appl. No. 10/903,391, Goyal, et al. (25 pages, specification, claims, abstract, and drawings), Jul. 30, 2004.

Cisco PIX Firewall and VPN Configuration Guide, Ver. 6.3 Cisco Systems (466 pages).

Cisco IOS Firewall Design Guide, Cisco Systems (60 pages), 1992-2005.

Cisco Secure Policy Manager Solution Guide Series: Intrusion Detection System, Ver. 2.3.1i (175 pages), Jul. 2001.

Cisco Router and Security Device Manager Firewall Policy Management Application Note, Cisco Systems, (19 pages), 2004.

USPTO; Office Action; for U.S. Appl. No. 10/910,194, (5 pages), transmitted Dec. 13, 2007.

USPTO; Office Action; for U.S. Appl. No. 10/903,391, (7 pages), transmitted Jul. 28, 2008.

* cited by examiner

INLINE INTRUSION DETECTION

TECHNICAL FIELD OF THE INVENTION

The present invention relates generally to the field of network security, and more particularly to inline intrusion detection.

BACKGROUND OF THE INVENTION

Intrusion detection systems (IDSs) generally operate in one of two modes. In "promiscuous" mode, the IDS monitors incoming network traffic to determine whether a particular pattern characteristic of an intrusion can be observed. In "in-line" mode, network traffic is scanned by the IDS to determine whether it contains a hostile signature. If a hostile signature is detected, the IDS prevents the network from receiving the traffic.

In at least some implementations of the in-line mode, packets travel from a network interface card (NIC) to a processing CPU over a relatively slow bus. A packet then travels back to the NIC after it has been determined whether the packet poses a security risk. This introduces significant overhead and performance limitations and provides for multiple points of failure.

SUMMARY OF THE INVENTION

A method for inline intrusion detection includes receiving a packet at a network gateway, storing the packet, and assigning an identifier to the packet. The method also includes transmitting a copy of the packet and the identifier from the network gateway to an intrusion detection system and analyzing the copy of the packet by the intrusion detection system to determine whether the packet includes an attack signature and communicating a reply message from the intrusion detection system to the network gateway. The reply message includes the identifier and is indicative of the results of the analysis. The size of the reply message is less than the size of the packet.

One technical advantage of certain embodiments of the present invention is the opportunity to conserve memory and bus resources in an IDS. By allowing an IDS to simply reply to a network gateway with an identifier and the desired action (or indication of whether or to what extent the packet contains an attack signature), rather than with the analyzed packet itself, communications between the network gateway and the IDS are expedited, allowing greater throughput for the IDS. Further, groups of packets may be disposed of by analysis of only a single packet, which further speeds the throughput of the IDS. This advantage may inhere, in some embodiments, in the location of functionality in the network gateway that can recognize groups of packets and control their disposition.

Additional technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF EXAMPLE EMBODIMENTS OF THE INVENTION

Figure 1:
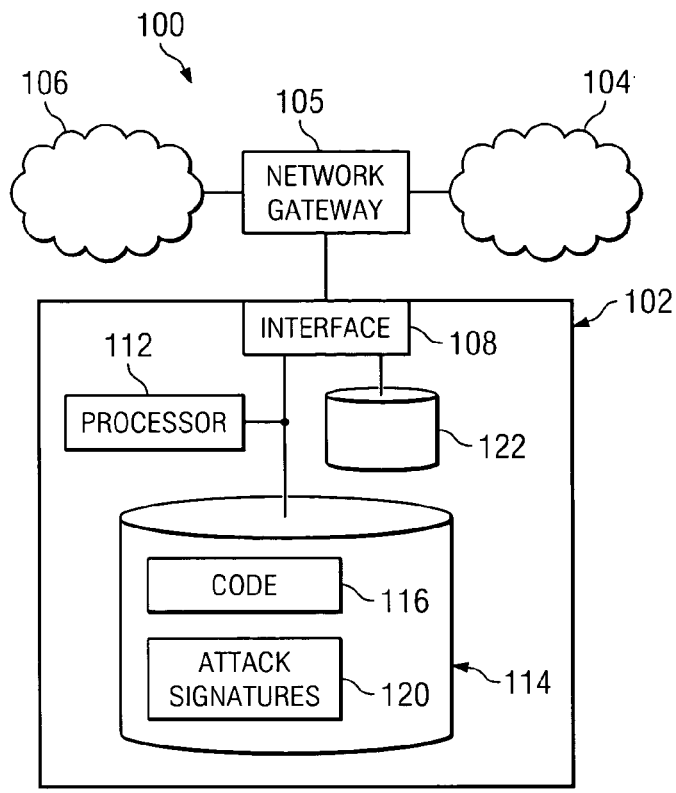
FIG. 1 illustrates an inline intrusion detection system according to the teachings of the invention.

FIG. 1 illustrates a computer system 100 that includes an inline intrusion detection system (IDS) 102 between an external network 104 and a protected network 106. Generally, IDS 102 receives a copy of information communicated, in packet form in one example, from external network 104 and analyzes the information to determine whether the information includes a signature that is characteristic of a network attack or other hostile action. Based on whether an attack is detected, several possible actions may be taken, including: (i) dropping the packet, (ii) allowing the packet to pass to protected network 106, (iii) allowing the packet to pass to protected network 106 after modification, (iv) dropping the packet as well as all related packets, and (v) allowing the packet as well as all related packets to pass to protected network 106.

According to the teachings of the invention, network gateway 105 stores the analyzed packet and provides a copy to IDS 102 for analysis, along with an identifier for the packet. In one example, the identifier is inserted into the header of the copy of the packet that is provided to IDS 102. After analysis, an indication of the results of the analysis of the packet is sent from IDS 102 to the network gateway 105 in combination with the identifier previously received by IDS 102. Then network gateway 105 can process the stored packet corresponding to the identifier according to the received indication of the results of the analysis. The received indication of the results of the analysis of the packet may be merely an indication of whether the packet contains an attack signature, one of the five example actions enumerated above, or other indication. By providing the indication of the results of the analysis of the packet, along with the identifier, the throughput of IDS 102 may be increased, in some embodiments, because of the ability to avoid a round trip transport of the packet between IDS 102 and network gateway 105. By simply transmitting the identifier and the indication of the results of the analysis of the packet, rather than the entire packet, from IDS 102 to network gateway 105, such a round trip is avoided, in some embodiments. Additional details of one embodiment of computer system 100 are described below.

External network 104 may include any collection of networked communication devices exchanging information. Networked communication devices may include hubs, routers, switches, gateways, personal computers, telephones, or any other device that can exchange information. Devices in external network 104 may exchange information in the form of packets, cells, frames, segments, or other portions of data (collectively referred to as "packets"). External network 104 may use any suitable medium or media of transmission, including wireline, wireless, or optical connections. Devices in external network 104 may communicate with one another using any number of suitable protocols, such as asynchronous transfer mode (ATM), transport control protocol/Internet protocol (TCP/IP), synchronous optical network (SONET), or Ethernet. External network 104 may also include the Internet.

Protected network 106 represents any collection of communication devices communicating in any suitable manner. In particular, protected network 106 may include any of the devices and communication media discussed in conjunction with external network 104. Protected network 106 may also use one or more suitable communication protocols, such as the ones described above.

Network gateway 105 represents any suitable hardware and/or software that communicates traffic received from external network 104 to protected network 106 and IDS 102. In one example, network gateway 105 is a "smart" network interface card (NIC) that is operable to generate an identifier for each received packet and forward a copy of that packet to IDS 102. Further, network gateway 105 may include functionality for addressing the above-described dispositions of the packet, in one embodiment. For example, network gateway 105 may modify both the header and body of any given packet in response to instructions from IDS 102 to do so. Also, network gateway 105 may determine an appropriate disposition of the packet, and take that action, based on an indication received from the IDS of the content of the received copy of the packet, e.g. whether the packet includes an identified attack signature. In another embodiment, network gateway 105 may keep a watchdog timer for each packet for which a copy was sent to IDS 102 and perform a default action based on expiration of the timer. The default action could be to pass the packet or to drop the packet. Having such a timer removes IDS 102 as a point of failure.

IDS 102 is an inline security system that receives traffic from external network 104, analyzes the traffic to determine if it contains an attack signature or other indication of hostile action, and prevents hostile information from reaching protected network 106 by communicating the identifier identifying the packet and an indication of the results of the intrusion detection analysis. In the depicted embodiment, IDS 102 includes an interface 108, a processor 112, and a memory 114. Processor 112 may be any hardware and/or software components suitable for processing information, such as microprocessors, microcontrollers, or digital signal processors (DSPs).

Memory 114 is any suitable form of information storage, which may include magnetic media, optical media, removable media, local storage, remote storage, or other suitable component. In the depicted embodiment, memory 114 stores code 116, and attack signatures 120. Code 116 is executed by processor 112 to perform any suitable task associated with IDS 102. Attack signatures 120 are recognized patterns of information that indicate that an incoming packet represents a hostile action directed at protected network 106. Processor 112 compares information to attack signatures 120 to detect attacks.

Interface 108 represents a physical connection allowing communication between IDS 102 and devices on protected network 106 and external network 104.

Interface 108 also includes, or is associated with, a buffer 122. Buffer 122 represents local information storage at interface 108. Buffer 122 may include any suitable form of information storage, such as magnetic media, flash memory, optical media, or other type of information storage medium. Buffer 122 stores incoming information from external network 104 while the information is processed by components of IDS 102. In a particular embodiment, buffer 122 retains a copy of incoming traffic while the traffic is being analyzed by processor 112 to determine whether the incoming information is hostile.

In one example of a mode of operation, network gateway 105 receives traffic from network 104, assigns an identifier to that traffic, and transmits a copy to IDS 102. IDS 102 receives the copy at interface 108, along with the identifier, and buffers them in buffer 122. IDS 102 communicates a copy of the packet to processor 112, which analyzes the traffic to determine whether it includes an attack signature. Processor 112 then returns a message to IDS 102 indicating whether the packet includes an attack signature. Depending on whether the packet includes an attack signature, IDS 102 takes appropriate action.

IDS 102 may transmit to network gateway an indication of the results of the analysis. In one embodiment, such indication is a code representative of the appropriate disposition of the packet, along with the identifier. Example dispositions are (i) dropping the packet, (ii) allowing the packet to pass to protected network 106, (iii) allowing the packet to pass to protected network 106 after modification, (iv) dropping the packet as well as all related packets (including packets note yet received), and (v) allowing the packet as well as all related packets (including packets not yet received) to pass to protected network 106. Then, network gateway 105 may effect the reported disposition. With respect to packets being related to other packets and disposing of related packets in the same way, network gateway 105 may determine that certain packets are related by source, destination, protocol, or other characteristics. Alternatively, IDS 102 may merely report an indication of whether, and/or to what extent, the analyzed packet contains an attack signature or other indication of hostile action, along with the identifier, and network gateway 105 determines the appropriate action to take.

Upon transmitting the copy of the packets to IDS 102, a timer may be set. If the timer expires before a response is received from IDS 102 by network gateway 105, then a default action may be taken, such as dropping the packet or allowing the packet to pass. Modification of a packet may involve modification of its header or body, or both. In particular, it may be desired to modify a packet to remove material determined to be potentially indicative of an attack signature or other potentially hazardous condition.

One technical advantage of certain embodiments of the present invention is the opportunity to conserve memory and bus resources in IDS 102. By allowing IDS 102 to simply reply to network gateway 105 with an identifier and the desired action (or indication of whether or to what extent the packet contains an attack signature), rather than with the analyzed packet itself, communications between network gateway 105 and IDS 102 are expedited, allowing greater throughput for IDS 102. Further, groups of packets may be disposed of by analysis of only a single packet, which further speeds the throughput of IDS 102. This advantage may inhere in some embodiments, in the location of functionality in network gateway 105 that can recognize groups of packets and control their disposition.

Figure 2:
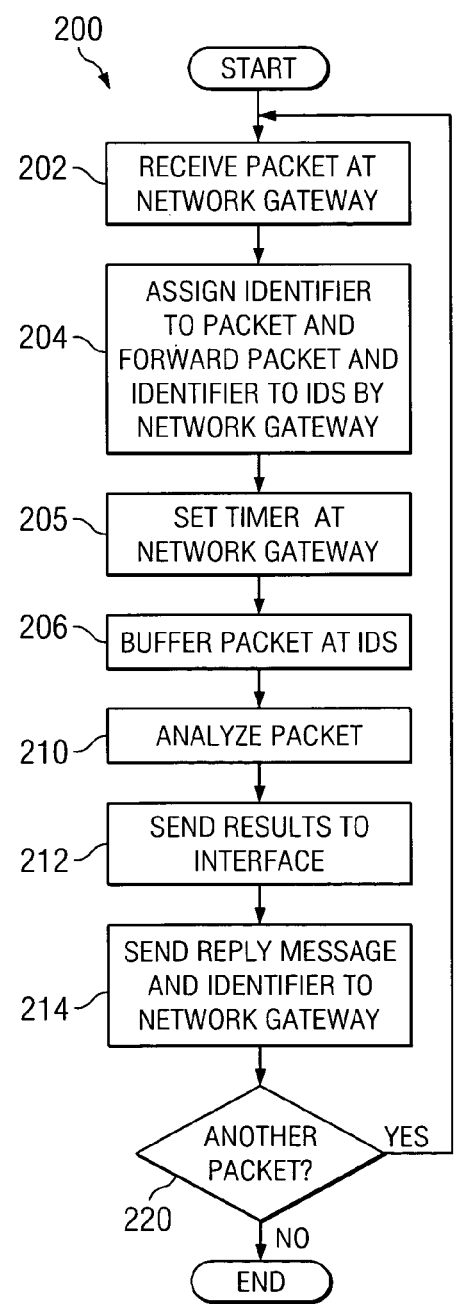
FIG. 2 illustrates a flow chart showing an example method of operation for the inline intrusion detection system of FIG. 1.

FIG. 2 is a flow chart 200 illustrating an example method of operation for IDS 102 in connection with network gateway 105. Network gateway 105 receives a packet destined for protected network 106 at step 202. At step 204 an identifier is assigned to the packet and a copy of the packet is forwarded to IDS 102 along with the identifier. In one example, the identifier forms a part of the packet forwarded to IDS 102. At step 205 a timer may be set. IDS 102 buffers the packet at buffer 122 at step 206. Interface 108 communicates a copy of the packet to processor 112 at step 208.

Processor 112 analyzes the packet by comparing the packet to attack signatures 120 at step 210. Based on whether an attack signature is detected at decision step 212, then processor 112 sends an applicable indication of the results of the analysis to interface 108 at step 212. As described above, the indication of the results of the analysis may take the form of one of the five actions enumerated above or other action, the form of a code, or alternatively, may be simply an indication of whether an attack signature or hazardous condition was detected at step 210. At step 214, the indication and the identifier are sent to network gateway 105, where appropriate action may be effected, as described above. If the timer set at step 205 expires before step 214 occurs, network gateway 105 may take a default action, such as dropping the packet or allowing it to pass. The method may be repeated as long as there are incoming packets, as shown by decision step 220.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for inline intrusion detection, comprising:
   receiving a packet at a network gateway;
   storing the packet at the network gateway and assigning an identifier to the packet;
   transmitting a copy of the packet and the identifier from the network gateway to an intrusion detection system;
   analyzing the copy of the packet, by the intrusion detection system, to determine whether the packet includes an attack signature;
   maintaining the packet at the network gateway while the copy is analyzed by the intrusion detection system;
   communicating a reply message, including the identifier, from the intrusion detection system to the network gateway, the reply message indicative of the results of the analysis and the size of the reply message being less than the size of the packet; and
   in response to the reply message taking, by the network gateway, an action selected from the group consisting of dropping the packet, allowing the packet to pass from the network gateway to a protected network, allowing the packet to pass from the network gateway to a protected network after modifying the packet, dropping the packet and dropping any related packet, and allowing the packet and any related packet to pass from the network gateway to a protected network.

2. The method of claim 1, wherein the reply message comprises an indication of whether the packet contained an attack signature.

3. The method of claim 1, wherein the reply message comprises an indication of a determined disposition of the packet.

4. The method of claim 3, wherein the reply message comprises an indication of an action to perform, the action selected from the group consisting of dropping the packet, allowing the packet to pass from the network gateway to a protected network, allowing the packet to pass from the network gateway to a protected network after modifying the packet, dropping the packet and dropping any related packet, and allowing the packet and any related packet to pass from the network gateway to a protected network.

5. The method of claim 4, wherein allowing the packet to pass from the network gateway to a protected network after modifying the packet comprises modifying the header of the packet.

6. The method of claim 4, wherein allowing the packet to pass from the network gateway to a protected network after modifying the packet comprises modifying a body of the packet to remove any material indicative of an attack signature.

7. The method of claim 1, and further comprising, in response to the reply message, dropping, by the network gateway, the packet and any related packet.

8. The method of claim 1, and further comprising setting a timer upon transmission of the packet from the network gateway to the intrusion detection system.

9. The method of claim 8, and further comprising allowing, by the network gateway, the packet to pass from the network gateway to a protected network upon expiration of the timer.

10. The method of claim 8, and further comprising dropping, by the network gateway, the packet upon expiration of the timer.

11. The method of claim 1, wherein transmitting the copy and the packet and the identifier comprises modifying a header of the packet to include the identifier.

12. Logic embodied in a computer-readable medium operable to perform the steps of:
    receiving a packet at a network gateway;
    storing the packet at the network gateway and assigning an identifier to the packet;
    transmitting a copy of the packet and the identifier from the network gateway to an intrusion detection system;
    analyzing the copy of the packet, by the intrusion detection system, to determine whether the packet includes an attack signature;
    maintaining the packet at the network gateway while the copy is analyzed by the intrusion detection system;
    communicating a reply message, including the identifier, from the intrusion detection system to the network gateway, the reply message indicative of the results of the analysis and the size of the reply message being less than the size of the packet; and
    in response to the reply message taking, by the network gateway, an action selected from the group consisting of dropping the packet, allowing the packet to pass from the network gateway to a protected network, allowing the packet to pass from the network gateway to a protected network after modifying the packet, dropping the packet and dropping any related packet, and allowing the packet and any related packet to pass from the network gateway to a protected network.

13. The logic of claim 12, wherein the reply message comprises an indication of whether the packet contained an attack signature.

14. The logic of claim 12, wherein the reply message comprises an indication of a determined disposition of the packet.

15. The logic of claim 14, wherein the reply message comprises an indication of an action to perform, the action selected from the group consisting of dropping the packet, allowing the packet to pass from the network gateway to a protected network, allowing the packet to pass from the network gateway to a protected network after modifying the packet, dropping the packet and dropping any related packet, and allowing the packet and any related packet to pass from the network gateway to a protected network.

16. The logic of claim 15, wherein allowing the packet to pass from the network gateway to a protected network after modifying the packet comprises modifying a header of the packet.

17. The logic of claim 15, wherein allowing the packet to pass from the network gateway to a protected network after modifying the packet comprises modifying a body of the packet to remove any material indicative of an attack signature.

18. The logic of claim 12, wherein the logic is further operable to, in response to the reply message, drop the packet and any related packet.

19. The logic of claim 12, wherein the logic is further operable to set a timer upon transmission of the packet from the network gateway to the intrusion detection system.

20. The logic of claim 19, wherein the logic is further operable to allow the packet to pass from the network gateway to a protected network upon expiration of the timer.

21. The logic of claim 19, wherein the logic is further operable to drop the packet upon expiration of the timer.

22. The logic of claim 12, wherein transmitting the copy and the packet and the identifier comprises modifying a header of the packet to include the identifier.

23. A system comprising:
 means for receiving a packet at a network gateway;
 means for storing at the network gateway the packet and assigning an identifier to the packet;
 means for transmitting a copy of the packet and the identifier from the network gateway to an intrusion detection system;
 means for analyzing the copy of the packet, by the intrusion detection system, to determine whether the packet includes an attack signature;
 means for maintaining the packet at the network gateway while the copy is analyzed by the intrusion detection system;
 means for communicating a reply message, including the identifier, from the intrusion detection system to the network gateway, the reply message indicative of the results of the analysis and the size of the reply message being less than the size of the packet; and
 in response to the reply message means for taking, by the network gateway, an action selected from the group consisting of dropping the packet, allowing the packet to pass from the network gateway to a protected network, allowing the packet to pass from the network gateway to a protected network after modifying the packet, dropping the packet and dropping any related packet, and allowing the packet and any related packet to pass from the network gateway to a protected network.

24. An apparatus, comprising:
 a communication link;
 a network gateway operable to:
  receive a packet at a network gateway;
  store the packet at the network gateway and assign an identifier to the packet; and
  transmit a copy of the packet and the identifier from the network gateway to an intrusion detection system; and
 the network intrusion detection system coupled to the network gateway by the communication link and operable to:
  analyze the copy of the packet to determine whether the packet includes an attack signature;
  maintain the packet at the network gateway while the copy is analyzed by the intrusion detection system;
  communicate a reply message, including the identifier, from the intrusion detection system to the network gateway, the reply message indicative of the results of the analysis and the size of the reply message being less than the size of the packet; and
  in response to the reply message take, by the network gateway, an action selected from the group consisting of dropping the packet, allowing the packet to pass from the network gateway to a protected network, allowing the packet to pass from the network gateway to a protected network after modifying the packet, dropping the packet and dropping any related packet, and allowing the packet and any related packet to pass from the network gateway to a protected network.

25. The apparatus of claim 24, wherein the reply message comprises an indication of whether the packet contained an attack signature.

26. The apparatus of claim 24, wherein the reply message comprises an indication of a determined disposition of the packet.

27. The apparatus of claim 26, wherein the reply message comprises an indication of an action to perform, the action selected from the group consisting of dropping the packet, allowing the packet to pass from the network gateway to a protected network, allowing the packet to pass from the network gateway to a protected network after modifying the packet, dropping the packet and dropping any related packet, and allowing the packet and any related packet to pass from the network gateway to a protected network.

28. The apparatus of claim 27, wherein the network gateway is further operable to allow the packet to pass from the network gateway to a protected network after modifying the packet by modifying a header of the packet.

29. The apparatus of claim 27, wherein the network gateway is further operable to allow the packet to pass from the network gateway to a protected network after modifying the packet by modifying a body of the packet to remove any material indicative of an attack signature.

30. The apparatus of claim 24, wherein the network gateway is further operable to, in response to the reply message, drop the packet and any related packet.

31. The apparatus of claim 24, wherein the network gateway is further operable to set a timer upon transmission of the packet from the network gateway to the intrusion detection system.

32. The apparatus of claim 31, wherein the network gateway is further operable to allow the packet to pass from the network gateway to a protected network upon expiration of the timer.

33. The apparatus of claim 31, wherein the network gateway is further operable to drop the packet from the network gateway upon expiration of the timer.

34. The apparatus of claim 24, wherein the network gateway is further operable to transmit the copy of the packet and the identifier by modifying a header of the packet to include the identifier.

* * * * *